(12) United States Patent
Bhat

(10) Patent No.: US 8,745,727 B2
(45) Date of Patent: Jun. 3, 2014

(54) GRAPHICAL USER INTERFACE TESTER

(75) Inventor: Venkataramana Bhat, Plano, TX (US)

(73) Assignee: Verizon Patent and Licensing Inc., Basking Ridge, NJ (US)

( * ) Notice: Subject to any disclaimer, the term of this patent is extended or adjusted under 35 U.S.C. 154(b) by 546 days.

(21) Appl. No.: 12/766,014

(22) Filed: Apr. 23, 2010

(65) Prior Publication Data

US 2011/0265175 A1    Oct. 27, 2011

(51) Int. Cl.
*G06F 11/07*    (2006.01)

(52) U.S. Cl.
USPC .................. 726/19; 726/7; 726/25; 380/277

(58) Field of Classification Search
USPC .......................................................... 726/19
See application file for complete search history.

(56) References Cited

U.S. PATENT DOCUMENTS

| | | | |
|---|---|---|---|
| 5,781,720 A * | 7/1998 | Parker et al. ............... 714/38.11 |
| 6,453,275 B1 * | 9/2002 | Schoenmaker et al. .......... 703/2 |
| 6,453,276 B1 * | 9/2002 | Bauman .......................... 703/15 |
| 7,181,360 B1 * | 2/2007 | Nikolac et al. ................ 702/119 |
| 2001/0052089 A1 * | 12/2001 | Gustavsson et al. ............ 714/38 |
| 2003/0005413 A1 * | 1/2003 | Beer et al. ...................... 717/125 |
| 2004/0107415 A1 * | 6/2004 | Melamed et al. ............. 717/124 |
| 2006/0010426 A1 * | 1/2006 | Lewis et al. ................... 717/124 |
| 2006/0179350 A1 * | 8/2006 | Nathan et al. ................... 714/38 |
| 2006/0271322 A1 * | 11/2006 | Haggerty ....................... 702/108 |
| 2007/0294586 A1 * | 12/2007 | Parvathy et al. ................ 714/38 |
| 2008/0155515 A1 * | 6/2008 | Stewart ......................... 717/135 |
| 2008/0209267 A1 * | 8/2008 | Xu et al. ......................... 714/25 |
| 2008/0295076 A1 * | 11/2008 | McKain et al. ............... 717/124 |

OTHER PUBLICATIONS http://www.cs.virginia.edu/~soffa/research/dissertations/atif.thesis.pdf, 2001.*

* cited by examiner

*Primary Examiner* — Kambiz Zand
*Assistant Examiner* — Yonas Bayou

(57) ABSTRACT

A method including accessing a test case that tests one or more user interfaces associated with another device, wherein the test case is defined in a spreadsheet; interpreting the test case; executing the test case with respect to the one or more user interfaces associated the other device; and outputting a test result.

20 Claims, 13 Drawing Sheets

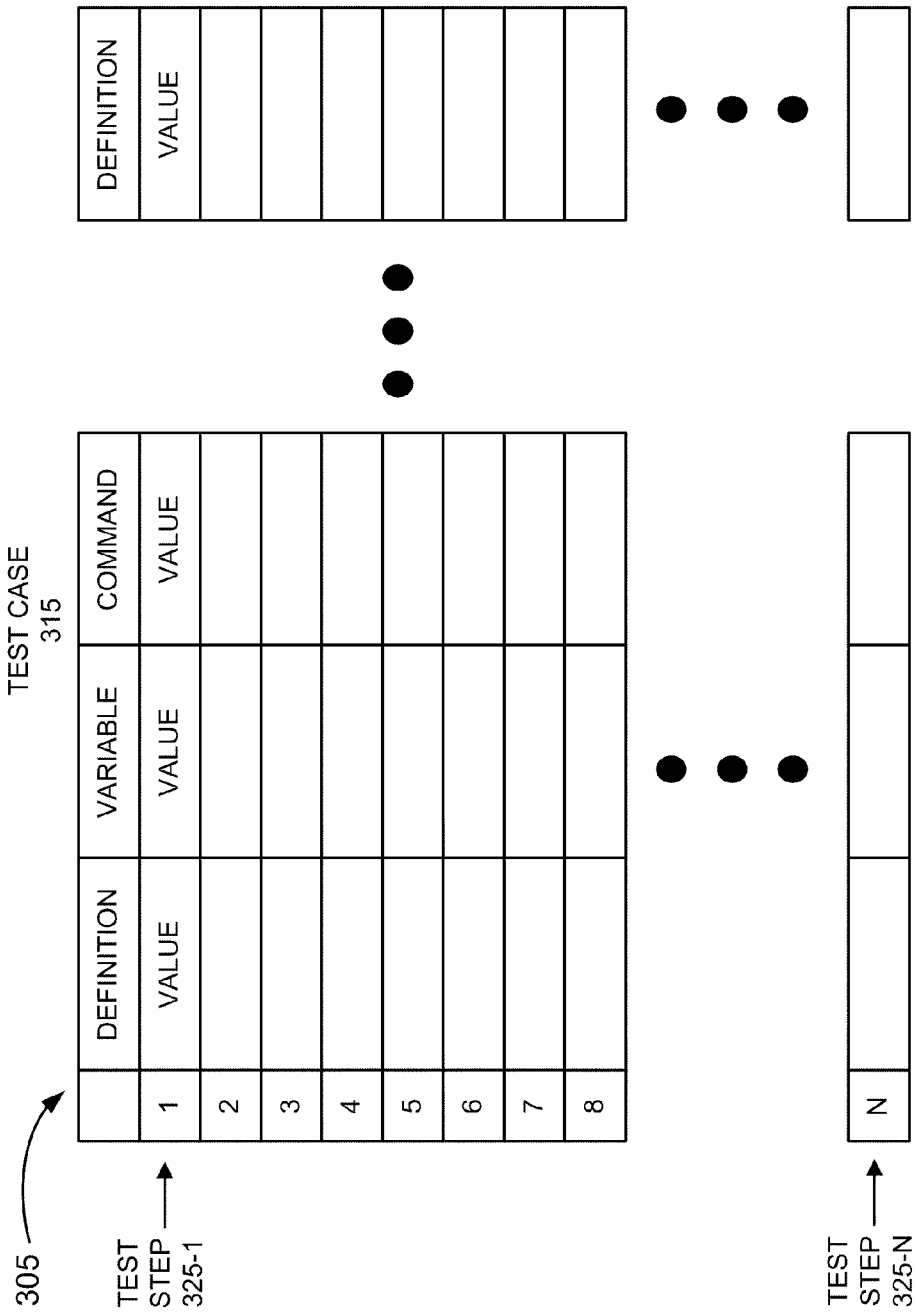

GRAPHICAL USER INTERFACE TESTER

BACKGROUND

Graphical User Interface (GUI) testers test a system that includes a GUI to ensure that the system meets certain specifications. Typically, a GUI tester will execute test cases, written as scripts, to validate the functionality of the system. For example, the test cases can test various keyboard and mouse inputs and capture how the system responds.

BRIEF DESCRIPTION OF THE DRAWINGS

FIG. 3B is a diagram illustrating an exemplary spreadsheet that may be executed by the GUI tester;

DETAILED DESCRIPTION OF PREFERRED EMBODIMENTS

Figure 1:
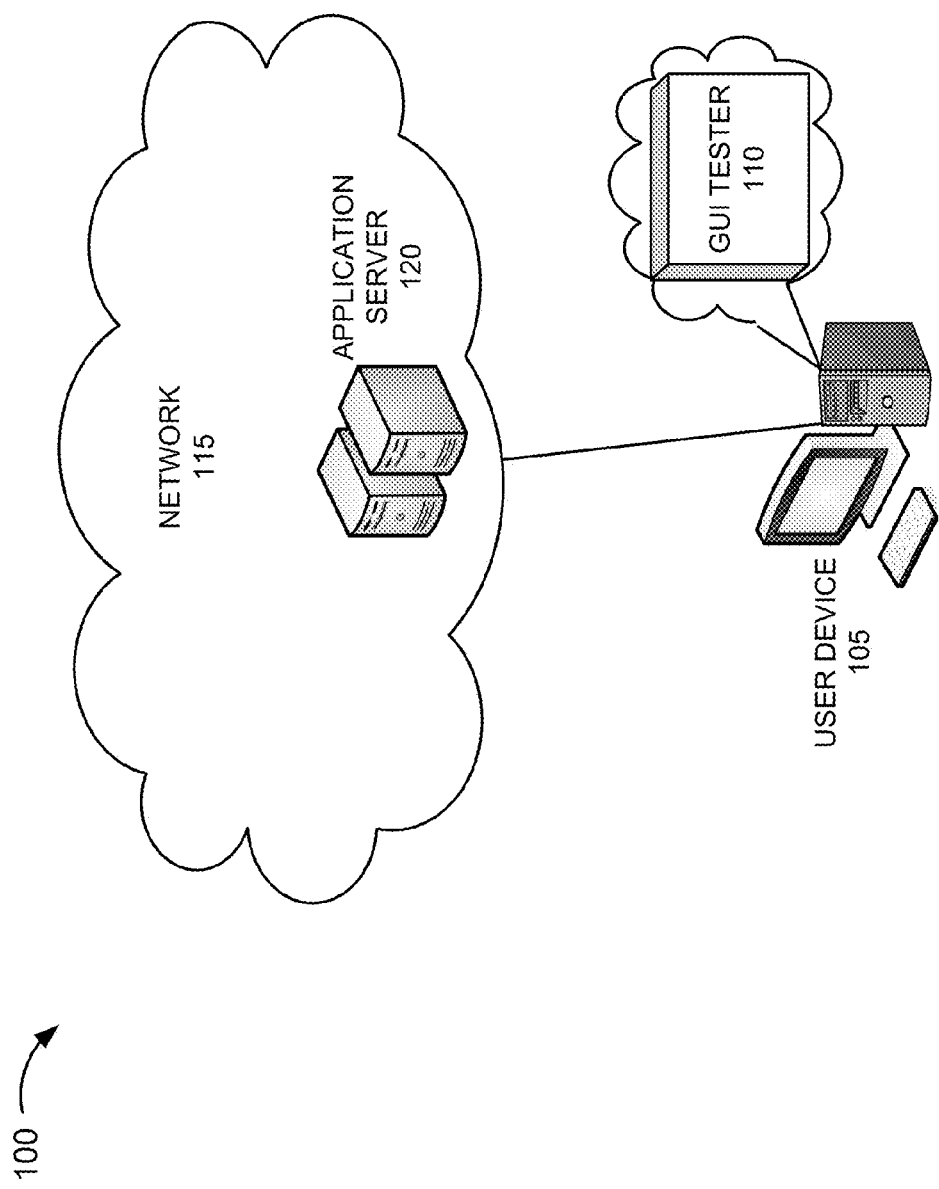
FIG. 1 is a diagram illustrating an exemplary environment in which an exemplary GUI tester may be implemented.

The following detailed description refers to the accompanying drawings. The same reference numbers in different drawings may identify the same or similar elements. Also, the following detailed description does not limit the invention.

The term "GUI tester," as used herein, is intended to be broadly interpreted to include a tester capable of testing GUIs and/or other types of user interfaces (e.g., non-graphical user interfaces, etc.).

The term "test case," as used herein, is intended to be broadly interpreted to include the entire test case (e.g., all test steps) or a portion of the test case (e.g., one or more test steps of the test case) used to test a user interface.

According to an exemplary embodiment, a GUI tester may interpret test cases defined in a spreadsheet. For example, the spreadsheet may have a row/column data arrangement forming multiple cells. According to an exemplary implementation, the GUI tester may interpret rows as test steps and interpret columns as specifying various parameters (e.g., test definitions, test variables, test commands, etc.) associated with the test case. For example, the test definitions may provide for various interactions with respect to a user interface, such as, for example, opening a window, moving a window, sizing a window, clicking on buttons, sending key inputs to input fields, operating on menus, submitting forms, and performing dragging operations with respect to any space associated with the user interface. The GUI tester may also read values displayed, perform arithmetic operations on the values read, perform translation of those values, and re-submit the translated values.

According to an exemplary embodiment of the GUI tester, a tester may create or edit a test case more easily compared to other conventional GUI testers since a test case may be defined in the spreadsheet. That is, other conventional GUI testers may require the testers to have knowledge of a scripting language or a programming language associated with the GUI testers, which in turn, may be more complex for testers to create or to edit the test case. In contrast, according to an exemplary embodiment of the GUI tester, the development of the test case may be easier and/or the cost associated with the development of the test case may be reduced. Additionally, the tester may reference other files (e.g., other spreadsheets, worksheets, etc.) in the spreadsheet, which may provide the tester with greater flexibility to manage information during the GUI testing process in comparison to other conventional GUI testers.

According to an exemplary embodiment, the GUI tester may retrieve username and/or password information from an encrypted file. According to an exemplary implementation, the GUI tester may retrieve username and/or password information using a custom variable password input by the tester. The custom variable password allows the GUI tester to open the encrypted file, retrieve the username and/or password information, and use it during a test case. For example, the username and/or password may be used as a log-on to a user interface being tested. This is in contrast to conventional GUI testers that include the username and/or password information in, for example, a test script. Further, the username and/or password information would not be encrypted.

According to an exemplary embodiment, the GUI tester may generate difference outputs. For example, the GUI tester may compare an expected output that includes information expected to be received when, for example, a user interface is loaded, and an actual output that includes information that is, for example, actually displayed within the user interface. The GUI tester may generate a difference output based on a comparison between the expected output and the actual output. The difference output may include difference information between the expected output and the actual output.

The GUI tester may also generate difference outputs with respect to responses associated with a test case. For example, an expected output may include information expected to be received in response to, for example, an action (e.g., a user's interaction) with respect to a user interface, and an actual output may include information that is, for example, a response actually received from the user interface when the action is performed. Additionally, according to an exemplary embodiment, a difference output may include a color-coding scheme to assist the tester when debugging, etc., as described further below.

The GUI tester may permit the tester to turn-on or turn-off the comparing feature either at a global level or at test case level. Further, according to an exemplary embodiment of the GUI test, the tester may control the comparing between an expected output and an actual output by including special words (e.g., to ignore a line, ignore multiple lines, ignore a word) in the expected output (e.g., an expected output file), as described further below.

According to an exemplary embodiment, the spreadsheet may include test definitions, variables, commands, and the like to allow the tester to define a test case. According to an exemplary embodiment, the tester may use a custom variable in the spreadsheet, which may be resolved by the GUI tester during execution of a test case. For example, a tester may create a custom variable file that defines a value for the custom variable. By way of example, but not limited thereto, the custom variable (e.g., $target_machine$) may correspond to a variable that identifies a target machine with which a user interface is being tested. A first tester may create a custom variable file that defines the target machine to test node 1, while a second tester may create a custom variable file that defines the target machine as test node 2. During execution of the test case, the GUI tester may recognize the custom variable because of its syntax (e.g., the use of the symbol $ and interpret the custom variable in accordance with the custom variable file. According to such an implementation, multiple testers may define their own unique value for the custom variable without having to change the test case defined in the spreadsheet. In this way, the test case defined in the spreadsheet becomes more portable between testers.

According to an exemplary embodiment, the GUI tester may permit the tester to execute a test case beginning at any test step within the test case. For example, the tester may start a test case beginning at a particular row (e.g., a test step) in the spreadsheet and execute the test case to another particular row (e.g., another test step). In another example, the tester may execute a single test step. This is contrast to conventional GUI testers that permit a tester to execute an entire test case and not a portion of a test case.

According to an exemplary embodiment, the GUI tester may permit a tester to retrieve data associated with a user interface and use this data when constructing a test case. For example, the data may include form names, field names, types of fields, etc., associated with a user interface. The tester may, for example, be able to copy-and-paste or populate this data into a spreadsheet, which may facilitate the constructing of the test case.

FIG. 1 is a diagram illustrating an exemplary environment 100 in which an exemplary GUI tester may be implemented. As illustrated in FIG. 1, environment 100 may include a user device 105 that includes a GUI tester 110 and a network 115 that includes an application server 120.

The number of devices and configuration in environment 100 is exemplary and provided for simplicity. In practice, environment 100 may include more devices, different devices, and/or differently arranged devices, than those illustrated in FIG. 1. By way of example, but not limited thereto, network 115 may include other types of network devices, such as gateways, switches, security devices, etc., intermediary networks, etc. Additionally, or alternatively, GUI tester 110 may test a device other than application server 120. Further, some functions described as being performed by a particular device may be performed by a different device or a combination of devices. Environment 100 may include wired and/or wireless connections among the devices illustrated. The connection between user device 105 and application server 120 is exemplary and provided for simplicity.

User device 105 may include a device having the capability to communicate with other devices, systems, networks, and/or the like. By way of example, but not limited thereto, user device may include a computer (e.g., a laptop, a desktop, etc.) and/or some other type of computational or communicative device.

GUI tester 110 may test user interfaces. For example, GUI tester 110 may test user interfaces associated with a web server, an application server, an end device (e.g., a mobile phone or the like), or a variety of other types of network devices or consumer devices. As previously described, according to an exemplary embodiment, GUI tester 110 may execute test cases that are defined in a spreadsheet. GUI tester 110 will be described further below.

Network 115 may include one or more networks of a variety of types. By way of example, but not limited thereto, network 115 may include a public network, a private network, a local area network (LAN), a wide area network (WAN), a data network, the Internet, an intranet, and/or some other type of wired network and/or wireless network, or combination thereof.

Application server 120 may include a device having the capability to communicate with other devices, systems, networks, and/or the like. Application server 120 may provide one or more services and/or assets based on a user's interaction with its user interface.

Figure 2:
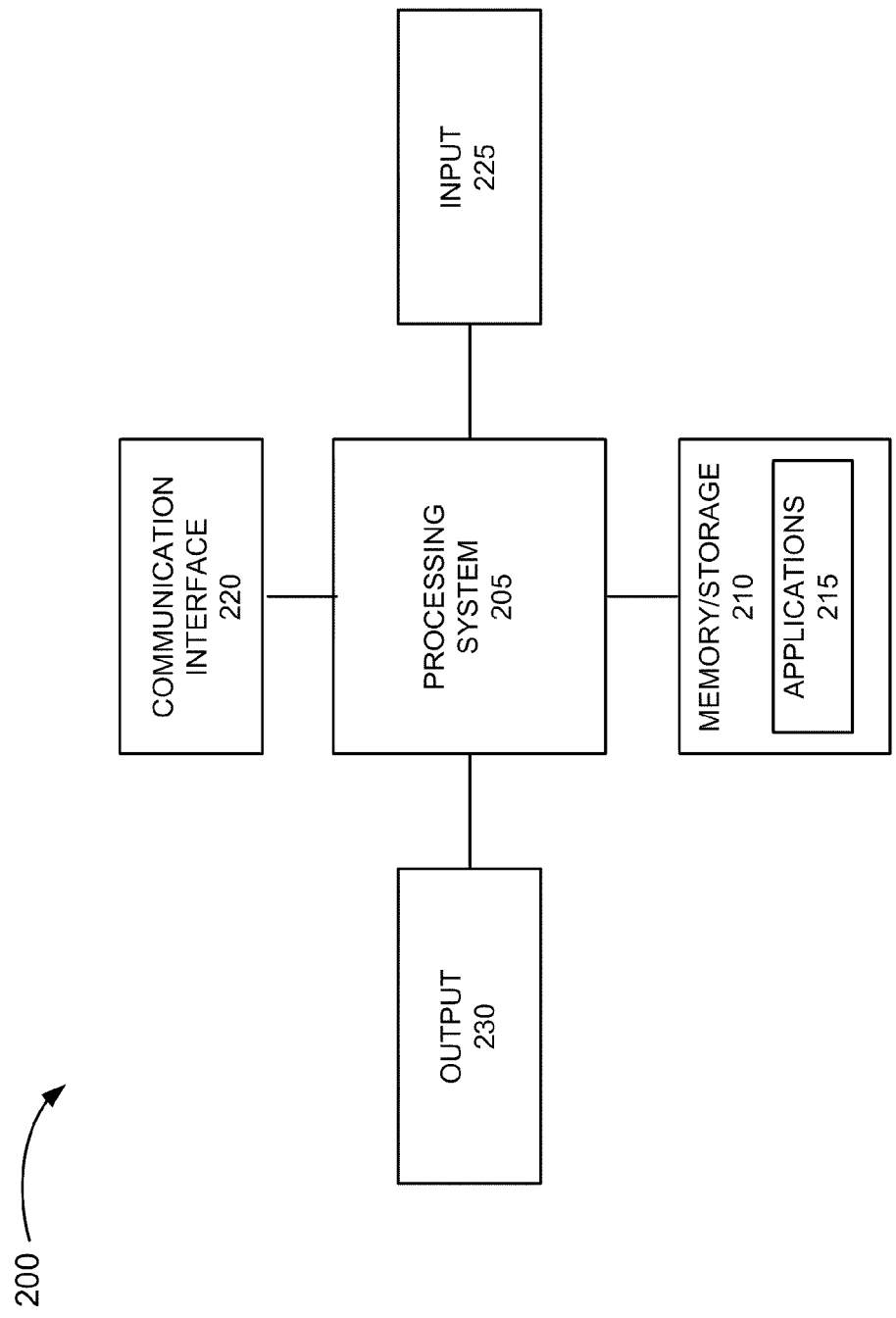
FIG. 2 is a diagram illustrating exemplary components of a device that may correspond to one or more of the devices in the environment depicted in FIG. 1.

FIG. 2 is a diagram illustrating exemplary components of a device 200 that may correspond to one or more of the devices in environment 100. For example, device 200 may correspond to user device 105 and application server 120. As illustrated, device 200 may include a processing system 205, memory/storage 210 including applications 215, a communication interface 220, an input 225, and an output 230. According to other implementations, device 200 may include fewer components, additional components, different components, and/or a different arrangement of components than those illustrated in FIG. 2 and described herein.

Processing system 205 may include one or multiple processors, microprocessors, data processors, co-processors, application specific integrated circuits (ASICs), controllers, programmable logic devices, chipsets, field programmable gate arrays (FPGAs), application specific instruction-set processors (ASIPs), system-on-chips (SOCs), and/or some other component that may interpret and/or execute instructions and/or data. Processing system 205 may control the overall operation or a portion of operation(s) performable by device 200. Processing system 205 may perform one or more operations based on an operating system and/or various applications (e.g., applications 215).

Processing system 205 may access instructions from memory/storage 210, from other components of device 200, and/or from a source external to device 200 (e.g., a network or another device).

Memory/storage 210 may comprise one or multiple memories and/or one or multiple secondary storages. For example, memory/storage 210 may comprise a random access memory (RAM), a dynamic random access memory (DRAM), a read only memory (ROM), a programmable read only memory (PROM), a flash memory, and/or some other type of memory. Memory/storage 210 may include a hard disk (e.g., a magnetic disk, an optical disk, a magneto-optic disk, a solid state disk, etc.) or some other type of computer-readable medium, along with a corresponding drive. Memory/storage 210 may include a memory and/or a secondary storage that is external to and/or removable from device 200, such as, for example, a Universal Serial Bus (USB) memory stick, a dongle, a hard disk, mass storage, off-line storage, etc.

The term "computer-readable medium," as used herein, is intended to be broadly interpreted to comprise, for example, a memory, a secondary storage, a compact disc (CD), a digital versatile disc (DVD), or the like. The computer-readable medium may be implemented in a single device, in multiple devices, in a centralized manner, or in a distributed manner. Memory/storage 210 may store data, application(s), and/or instructions related to the operation of device 200.

Memory/storage 210 may store data, applications 215, and/or instructions related to the operation of device 200. For example, with reference to user device 105, applications 215 may include a GUI tester application in correspondence to GUI tester 110. Additionally, for example, with reference to application server 120, applications 215 may include an application that provides a service or an asset.

Communication interface 220 may permit device 200 to communicate with other devices, networks, systems and/or the like. Communication interface 220 may include a wireless interface and/or a wired interface. Communication interface 220 may include a transmitter, a receiver, and/or a transceiver. Communication interface 220 may operate according to various protocols, standards, and the like.

Input 225 may permit an input into device 200. For example, input 225 may include a keyboard, a mouse, a microphone, a display, a touchpad, a button, a switch, an input port, voice recognition logic, fingerprint recognition logic, a web cam, and/or some other type of visual, auditory, tactile, etc., input component.

Output 230 may permit an output from device 200. For example, output 230 may include a speaker, a display, one or more light emitting diodes (LEDs), an output port, and/or some other type of visual, auditory, tactile, etc., output component.

As described herein, device 200 may perform processes in response to processing system 205 executing software instructions (e.g., applications 215) contained in a computer-readable medium, such as memory/storage 210. By way of example, but not limited thereto, the software instructions may be read into memory/storage 210 from another computer-readable medium or from another device via communication interface 220. The software instructions stored in memory/storage 210 may cause processing system 205 to perform processes described herein. Alternatively, device 200 may perform processes based on hardware, hardware and firmware, and/or hardware, software, and firmware.

Figure 3A:
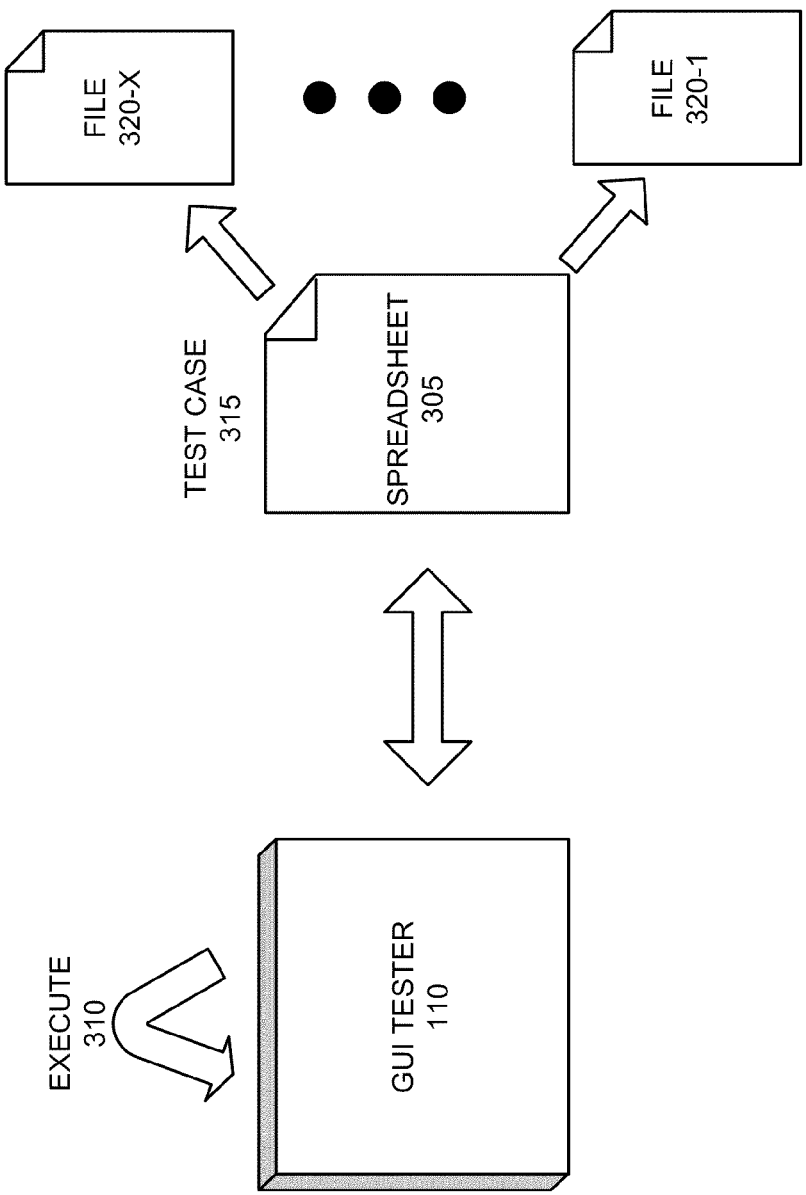
FIG. 3A is a diagram illustrating the use of a spreadsheet by the GUI tester.

As previously described, according to an exemplary embodiment, GUI tester 110 may interpret test cases defined in a spreadsheet. FIG. 3A is a diagram illustrating the use of a spreadsheet by GUI tester 110. Referring to FIG. 3A, GUI 110 may execute 310 a test case 315 based on a spreadsheet 305. For example, a tester may define test case 315 in spreadsheet 305. As further illustrated, GUI tester 110 may execute 310 one or multiple other files 320-1 to 320-X (referred to generally as other file(s) 320), which may be referenced (e.g., through the use of custom variables, etc.) in spreadsheet 305. For example, other file(s) 320 may correspond to additional spreadsheet(s), encrypted file(s), worksheet(s), or the like.

FIG. 3B is a diagram illustrating an exemplary spreadsheet 305 that may be executed by GUI tester 110. As previously described, spreadsheet 305 may have a row/column data arrangement that forms multiple cells. For example, test case 315 may include test steps 325-1 through 325-N (referred to generally as test step 325) in which each row may define a test step 325. According to an exemplary implementation, columns may include various parameters pertaining to test case 315. For example, the columns may include test variables (e.g., debug level, sleep-time, compare mode, on error go to, maximum error, etc.), test definitions (e.g., test name, test description, form value, field type, field name, mouse click, send key, window move, window navigate, etc.), test commands (e.g., compare, display wait time, run test, get values, etc.), and the like. Additionally, rows may include various values (e.g., test data, values, etc.).

Figure 4A:
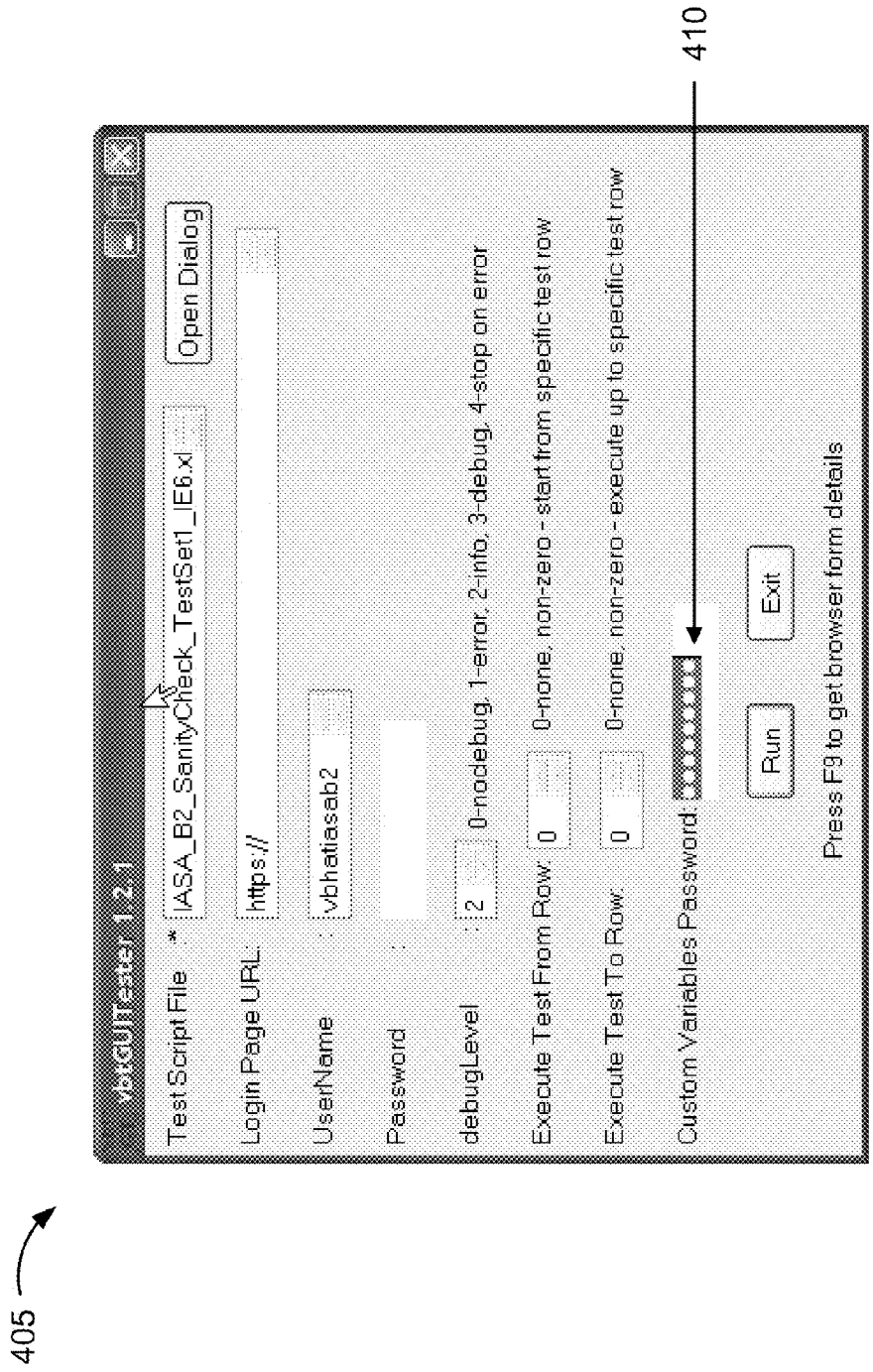
FIG. 4A is a diagram illustrating an exemplary user interface including a custom variable password field that is associated with the GUI tester.
Figure 4B:
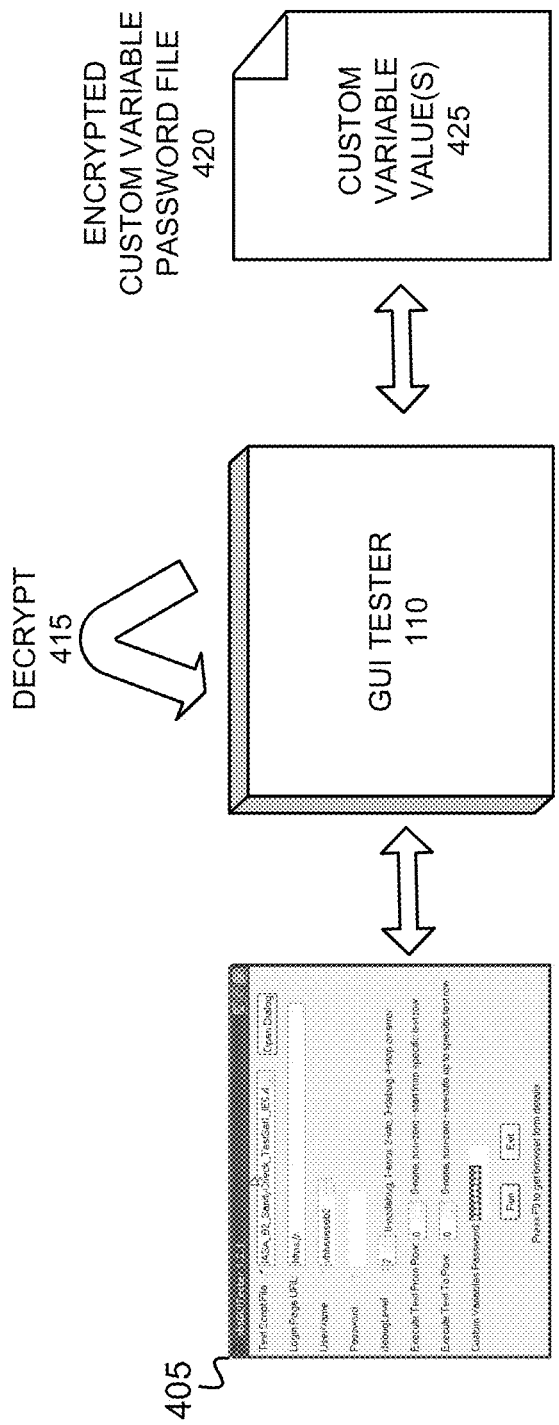
FIG. 4B is a diagram illustrating an exemplary process performable by the GUI tester for decrypting an encrypted file based on a custom variable password.

As previously described, according to an exemplary embodiment, GUI tester 110 may retrieve username and/or password information from an encrypted file. FIG. 4A is a diagram illustrating an exemplary user interface 405 including a custom variable password field that is associated with GUI tester 110. As illustrated, user interface 405 associated with GUI tester 110 may include an input field for a tester to enter a custom variable password 410. According to an exemplary process, as illustrated in FIG. 4B, GUI tester 110 may decrypt 415 an encrypted custom variable password file 420 using custom variable password 410, decode a password 425, and use password 425 during an execution of a test case. According to other exemplary implementations, customer variable password 410 may permit GUI tester 110 to decrypt an encrypted file that includes sensitive information other than a password. By way of example, but not limited thereto, the sensitive information may include log-in information (e.g., a username, etc.).

Figure 5A:
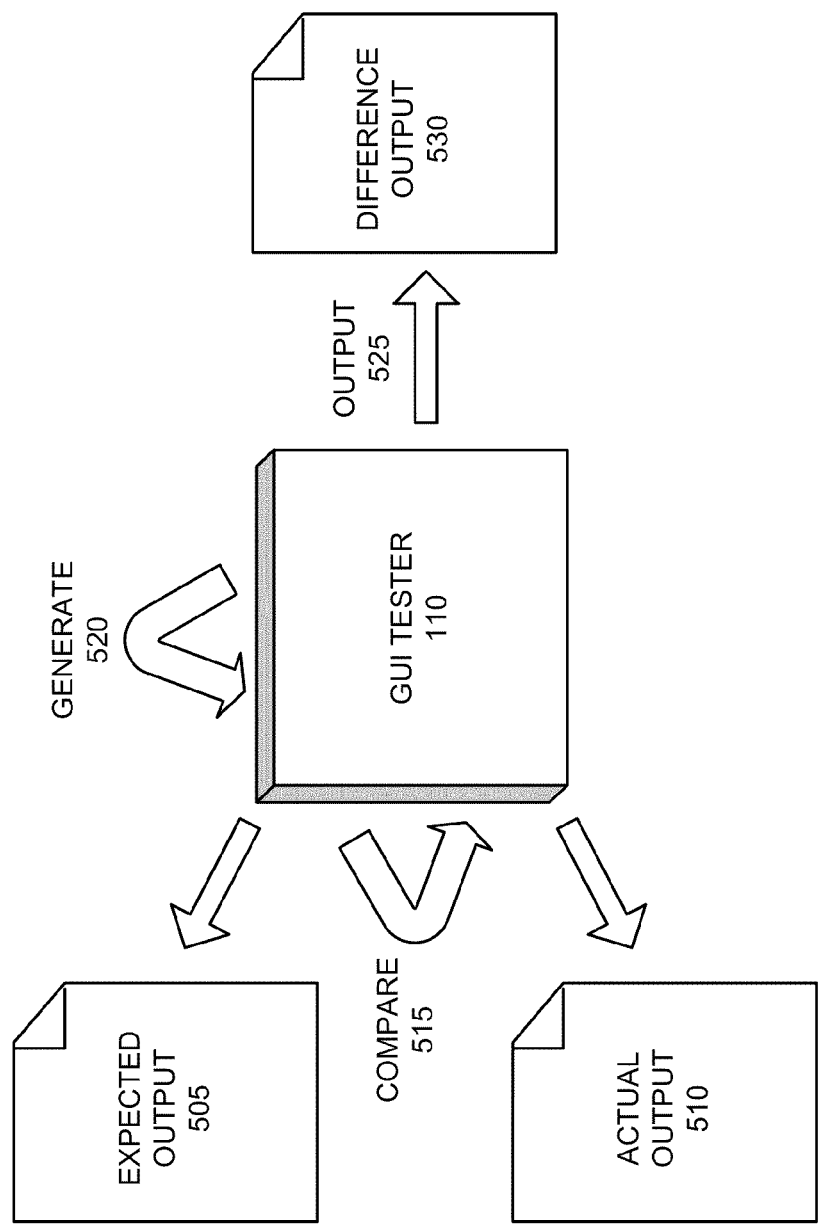
FIG. 5A is a diagram illustrating an exemplary process performable by the GUI tester for generating a difference output.

As previously described, according to an exemplary embodiment, GUI tester 110 may generate difference outputs based on comparisons between expected outputs and actual outputs. FIG. 5A is a diagram illustrating an exemplary process performable by GUI tester 110 for generating a difference output. As illustrated, GUI tester 110 may compare 515 an expected output 505 to an actual output 510, which may be associated with a test case.

As previously described, according to an exemplary implementation, expected output 505 may include information expected to be received when, for example, a user interface is loaded or when a command (e.g., search, open, etc.) is executed on a remote host (e.g., application server 120), via GUI tester 110, so as to perform some operation on the remote host (e.g., to inspect a configuration file, a report, a database, or some other text information). According to another implementation, expected output 505 may include information expected to be received when, for example, an action is taken on a user interface (e.g., a user interaction, a user input), when a form is saved or submitted, etc.

With reference to actual output 510, according to an exemplary implementation, actual output 510 may include information actually received when, for example, a user interface is loaded or when a command is executed on the remote host, via GUI tester 110, so as to perform some operation on the remote host. According to another implementation, actual output 510 may include information actually received when, for example, an action is taken on a user interface, when a form is saved or submitted, etc.

Figure 5B:
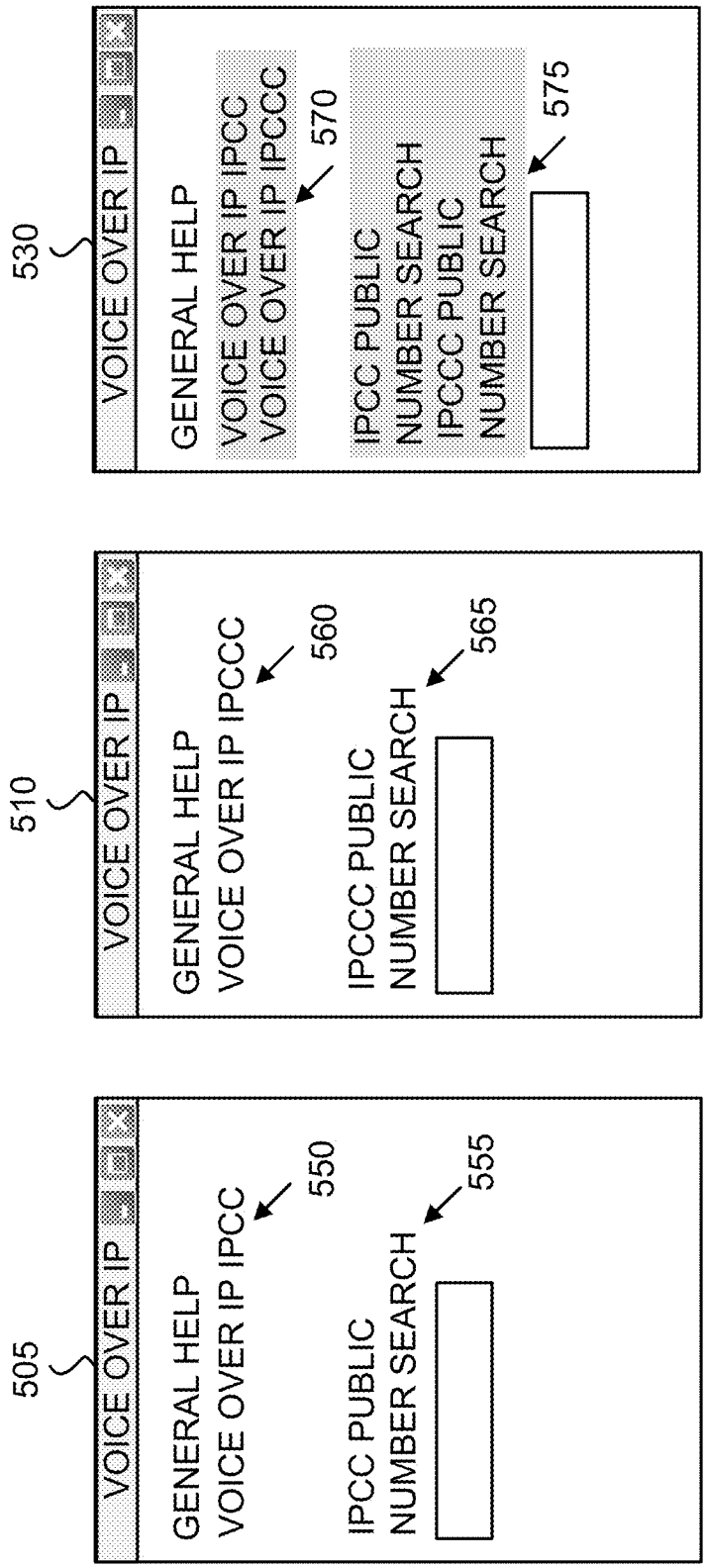
FIG. 5B is a diagram illustrating an exemplary expected output, an exemplary actual output, and an exemplary difference output in relation to when an exemplary web page is loaded.

When GUI tester 110 compares 515 expected output 505 and actual output 510, GUI tester 110 may generate 520 a difference output 530. Difference output 530 may include the difference information between expected output 505 and actual output 510. FIG. 5B is a diagram illustrating an exemplary expected output 505, an exemplary actual output 510, and an exemplary difference output 530 in relation to when an exemplary web page is loaded. As illustrated, expected output 505 may include a field 550 (e.g., Voice Over IP IPCC) and a field 555 (e.g., IPCC Public Number Search) and actual output 510 may include a field 560 (e.g., Voice Over IP IPCCC) and a field 565 (e.g., IPCCC Public Number Search). As previously described, GUI tester 110 may compare expected output 505 and actual output 510 to generate difference output 530. As illustrated, difference output 530 includes difference fields 570 and 575. Additionally, according to an exemplary implementation, difference output 530 may include a color-coding scheme to assist the tester when debugging, etc. For example, GUI tester 110 may color code "Voice Over IP IPCC" in one color to indicate that this field originated from expected output 505 and color code "Voice Over IP IPCCC" in another color to indicate that this field originated from actual output 510. The tester may turn-on or turn-off the this comparing feature either at a global level or at test case level.

Further, the tester may control the comparison made by GUI tester 110 by including special words to ignore a line, ignore a word, ignore multiple lines, etc. For example, the tester may choose to ignore lines or words associated with a user interface that frequently change (e.g., a date, a version number, account information, a transaction identifier, etc.). In this way, difference output 530 may not indicate differences between expected output 505 and actual output 510 which may be unimportant to the tester, etc. According to an exemplary implementation, the tester may insert special words in expected output 505 (e.g., an expected output file) to cause GUI tester 110 to ignore a line, a word, multiple words, ignore lines until a blank line, ignore all except, etc. when performing the comparison to actual output 510. For example, special words may correspond to "ignore this line", "ignore until blank line," etc.

As previously described, according to an exemplary embodiment, a spreadsheet may include test definitions, test variables, test commands, and the like to allow the tester to define a test case. According to the exemplary embodiment, the tester may use a custom variable in the spreadsheet, which may be resolved by GUI tester 110 during execution of a test case.

Figure 6:
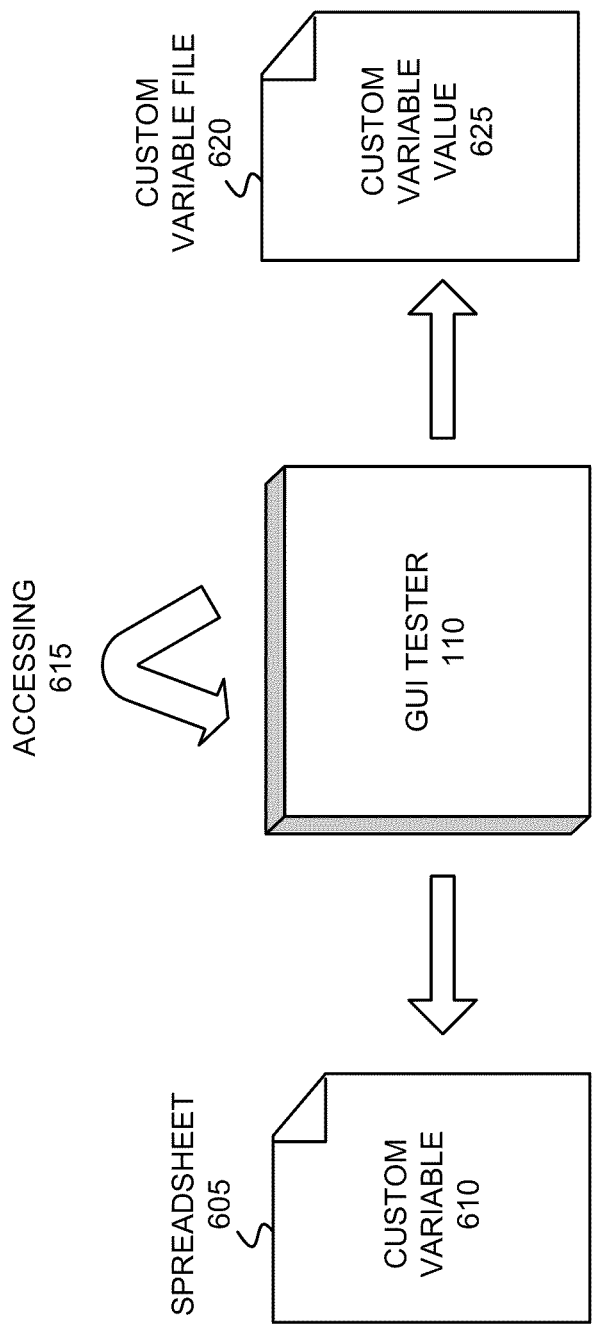
FIG. 6 is a diagram illustrating an exemplary process performable by the GUI tester in relation to a custom variable.

FIG. 6 is a diagram illustrating an exemplary process performable by GUI tester 110 in relation to a custom variable. As illustrated, according to an exemplary implementation, a tester may specify a custom variable 610 in spreadsheet 605. Custom variable 610 may correspond to any parameter associated with a test case. According to an exemplary implementation, custom variable 610 may have a particular syntax so that GUI tester 110 recognizes custom variable from other types of parameters. For example, a string may begin or end with a particular symbol (e.g., $, #, etc.). During execution of the test case, GUI tester 110 may interpret custom variable 610 by accessing 615 a custom variable file 620 that includes a custom variable value 625. According to such an implementation, custom variable file 620 may have a predefined name so that GUI tester 110 is able to locate custom variable file 620 and custom variable value(s) 625 therein. According to such an implementation, multiple testers may define their own unique value for custom variable 610 without having to change the test case defined in spreadsheet 605. In this way, the test case defined in spreadsheet 605 provides a significant level of portability between testers because testers may not have to edit the test case. Rather, a tester may edit custom variable values 625 in custom variable file 620 without having to edit spreadsheet 605.

Figure 7:
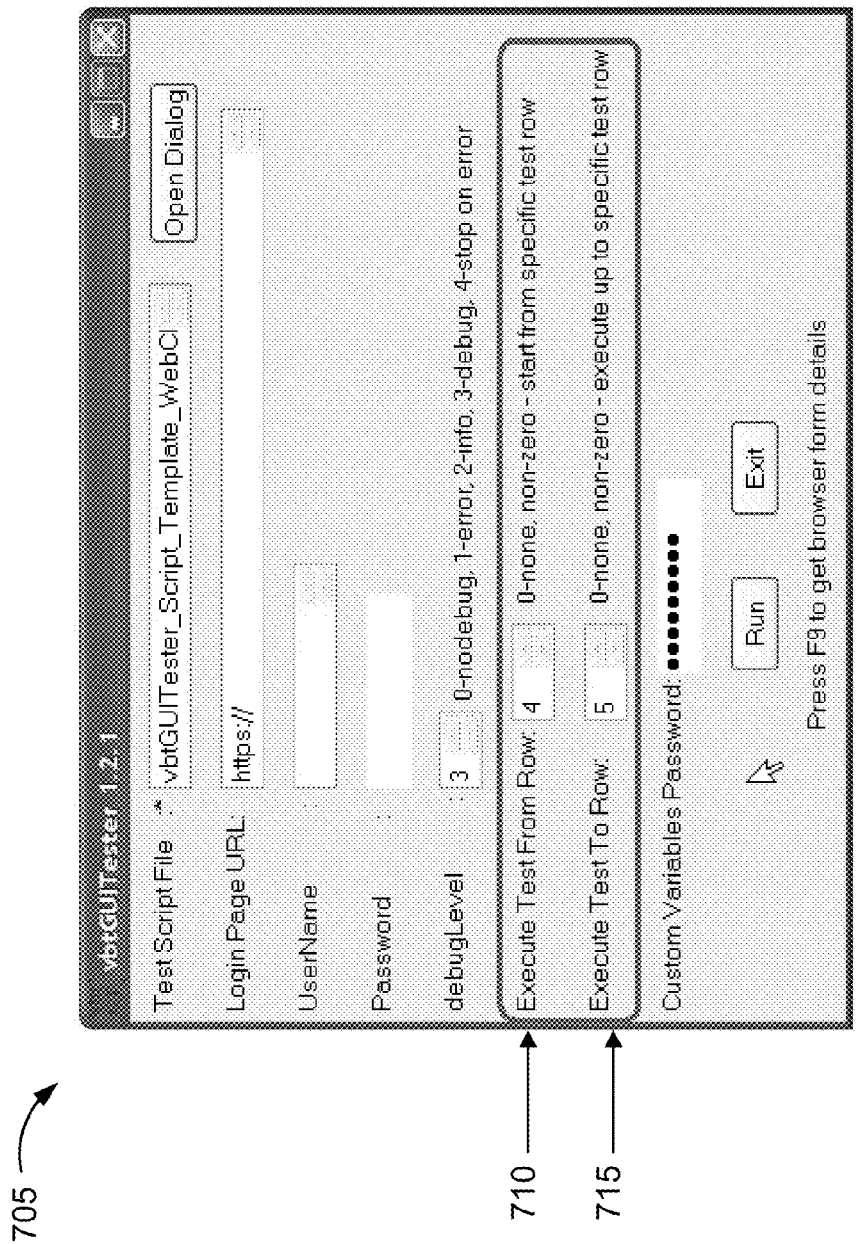
FIG. 7 is a diagram illustrating an exemplary user interface of the GUI tester that permits a tester to define a step-wise execution of a test case.

As previously described, according to an exemplary embodiment, GUI tester 110 may permit a tester to execute a test case beginning at any test step and ending at any test step. For example, the tester may execute a test case beginning at a particular row (e.g., a test step) in the spreadsheet and ending at another particular row in the spreadsheet, or simply execute a single test step in the spreadsheet. FIG. 7 is a diagram illustrating an exemplary user interface of GUI tester 110 that permits a tester to define a step-wise execution of a test case. As illustrated, an exemplary user interface 705 may include a from row field 710 and a to row field 715. The tester may specify which test steps GUI tester 110 is to execute.

Figure 8A:
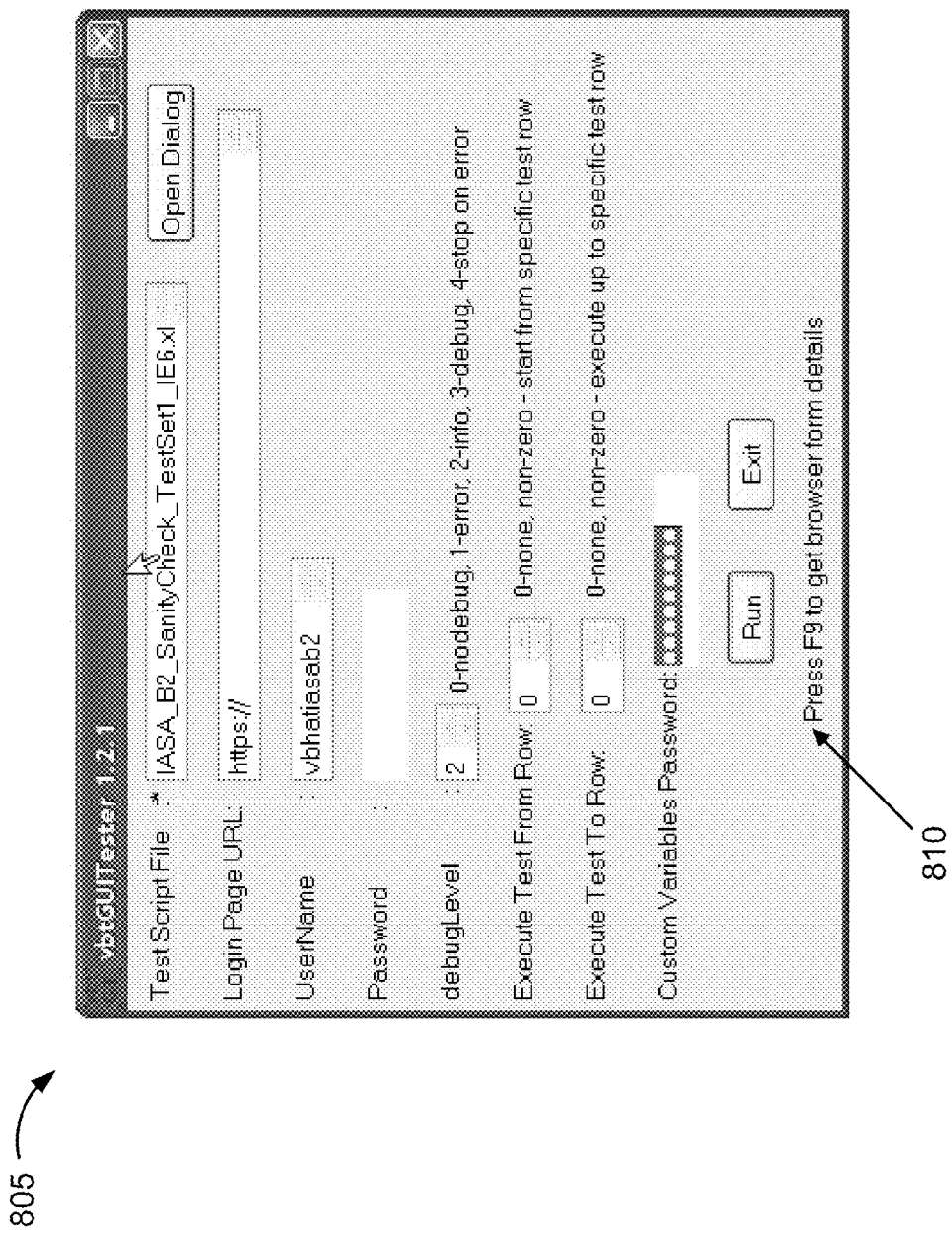
FIG. 8A is a diagram illustrating an exemplary user interface of the GUI tester that permits a tester to invoke a retrieval of data associated with a user interface being tested.

As previously described, according to an exemplary embodiment, GUI tester 110 may permit a tester to retrieve data associated with a user interface and use this data when constructing a test case. FIG. 8A is a diagram illustrating an exemplary user interface of GUI tester 110 to permit a tester to invoke a retrieval of data associated with a user interface being tested. As illustrated, a user interface 805 may indicate to the tester to press a function key 810 (e.g., the F9 key) to get browser form details. According to other implementations, user interface 805 may respond to another type of input (e.g., other keys, etc.) provided by the tester to retrieve data associated with the user interface being tested.

Figure 8B:
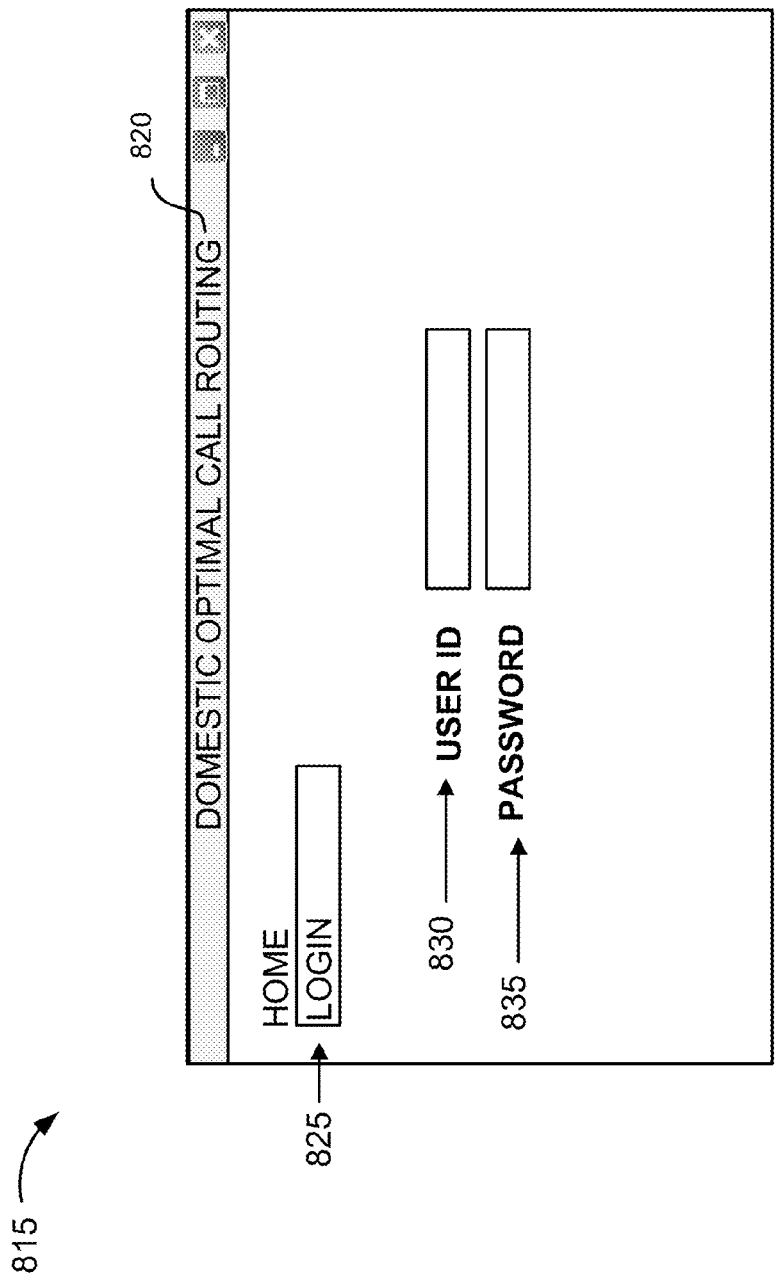
FIG. 8B is a diagram illustrating an exemplary user interface that may be tested by the GUI tester.

FIG. 8B is a diagram illustrating an exemplary user interface 815 that may be tested by GUI tester 110. As illustrated, user interface 815 may include a page title 820 (e.g., Domestic Optimal Call Routing), a form name (e.g., login), and element names 830 and 835 (e.g., user identifier (ID) and password). Provided below is exemplary data that may be retrieved by GUI tester 110 based on user interface 815 when the tester presses function key 810:

Page title: Domestic Optimal Call Routing
FrameName: Top
FrameName: Main
FormName: Login
FormName: Login: ElementName: UserID|type: text|value: 0
FormName: Login: ElementName: Password|type: password|value: 0

The tester may, for example, copy-and-paste this data into a spreadsheet and facilitate the constructing of the test case.

Figure 9:
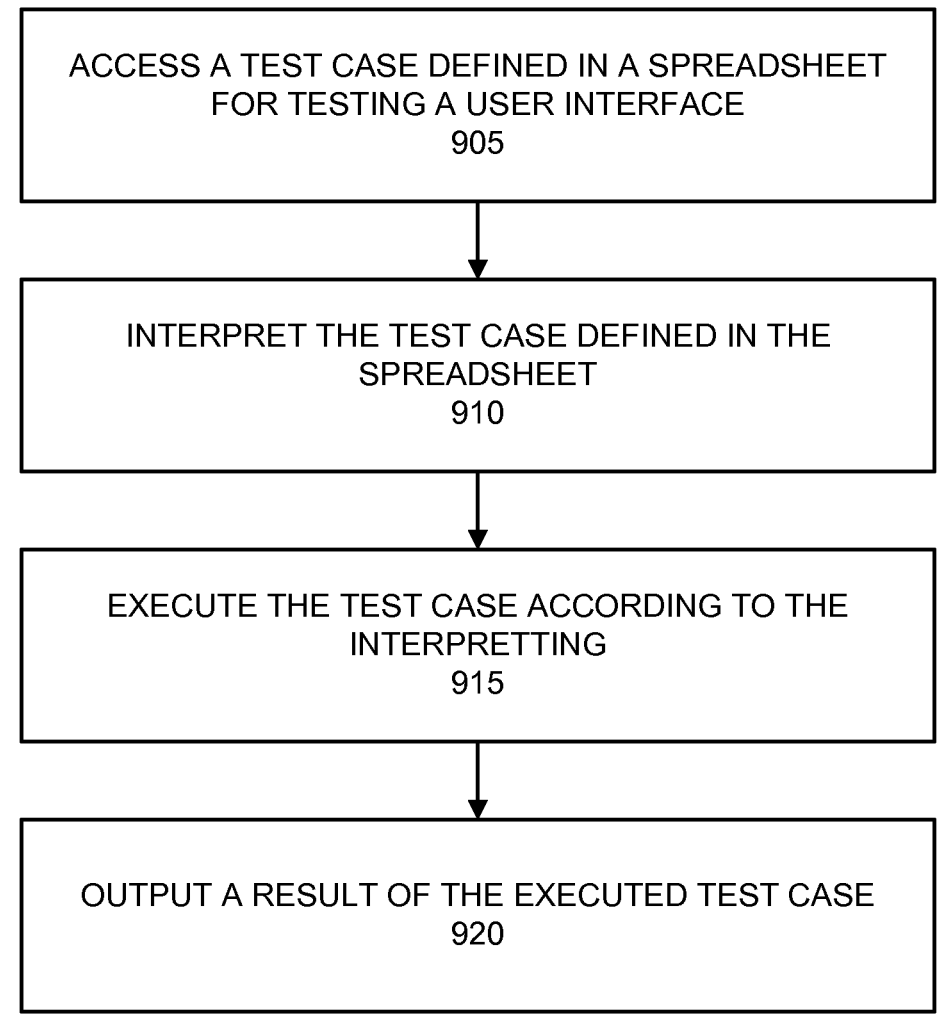
FIG. 9 is a flow diagram illustrating an exemplary process performable by the GUI tester for testing a user interface.

FIG. 9 is a flow diagram illustrating an exemplary process 900 performable by GUI tester 110 for testing a user interface. Process 900 may include accessing a test case defined in a spreadsheet for testing a user interface (block 905). For example, GUI tester 110 may access a spreadsheet stored in memory/storage 210. The spreadsheet may define test case for testing a user interface associated with another device (e.g., application server 120, etc.).

The test case defined in the spreadsheet may be interpreted (block 910). For example, GUI tester 110 may interpret the spreadsheet according to the test definitions, values, test variables, test commands, etc., specified in the spreadsheet. As previously described, in some instances, the spreadsheet may also reference other files (e.g., other spreadsheets, customary variable files, etc.). GUI tester 110 may interpret the test case in view of these other files.

The test case may be executed according to the interpreting (block 915). For example, GUI tester 110 may execute the test case in accordance with the interpreting of the test case. That is, GUI tester 110 may test the user interface associated with the other device in accordance with the test case.

A result of the executed test case may be output (block 920). For example, GUI tester 110 may output a test result that identifies successes and/or failures relating to the test case and the user interface associated with the other device. GUI tester 110 may output files (e.g., a difference output, a spreadsheet, etc.) or other information (e.g., device responses, etc.) to indicate to the tester various states associated with the user interface tested, etc.

Although FIG. 9 illustrates an exemplary process 900 for testing a user interface, in other implementations, process 900 may include additional operations, fewer operations, and/or different operations than those illustrated in FIG. 9 and described. For example, process 900 may include operations associated with a use of a custom variable password, a generation of a difference output, a use of a custom variable, test step execution, and/or a retrieval of data associated with a user interface being tested, as previously described.

The foregoing description of implementations provides illustration, but is not intended to be exhaustive or to limit the implementations to the precise form disclosed. Accordingly, modifications to the implementations described herein may be possible.

The terms "a," "an," and "the" are intended to be interpreted to include one or more items. Further, the phrase "based on" is intended to be interpreted as "based, at least in part, on," unless explicitly stated otherwise. The term "and/or" is intended to be interpreted to include any and all combinations of one or more of the associated items.

In addition, while a series of blocks has been described with regard to the process illustrated in FIG. 9, the order of the blocks may be modified in other implementations. Further, non-dependent blocks may be performed in parallel. Additionally, other processes described in this description may be modified and/or non-dependent operations may be performed in parallel.

It will be apparent that the embodiments described herein may be implemented in many different forms of software or firmware in combination with hardware in the implementations illustrated in the figures. The actual software code (executable by hardware) or specialized control hardware used to implement the device, method, and/or system does not limit the disclosure of the invention. Thus, the operation and behavior of the devices and/or systems, or the performing of the methods was described without reference to the specific software code—it being understood that software and control hardware can be designed to implement the device, method, and/or system based on the description herein.

Further certain features described above may be implemented as "logic" or a "component" that performs one or more functions. This logic or component may include hardware (e.g., processing system 205, etc.), a combination of hardware and software (e.g., applications 215), a combination of hardware and firmware, or a combination of hardware, firmware, and software.

In the preceding specification, various embodiments have been described with reference to the accompanying drawings. It will, however, be evident that various modifications and changes may be made thereto, and additional embodiments may be implemented, without departing from the broader scope of the invention as set forth in the claims that follow. The specification and drawings are accordingly to be regarded as illustrative rather than restrictive.

No element, act, or instruction used in the present application should be construed as critical or essential to the implementations described herein unless explicitly described as such.

What is claimed is:

1. A method comprising:
   accessing, by a device, a test case that tests one or more user interfaces associated with another device, wherein the test case is defined in a spreadsheet;
   interpreting, by the device, the test case, wherein a row in the spreadsheet is interpreted as a test step of the test case;
   executing, by the device, the test case with respect to the one or more user interfaces, wherein the executing comprises:
      recognizing a syntax of a custom variable included in the spreadsheet;
      accessing a custom variable file in response to the recognizing, wherein the custom variable file stores a custom variable value;
      retrieving the custom variable value; and
      executing the test case using the custom variable value; and
   outputting, by the device, a test result.

2. The method of claim 1, further comprising:
   receiving a user input corresponding to a custom access variable;
   decrypting an encrypted file based on the custom access variable; and
   retrieving at least one of a username or a password from the encrypted file, wherein the at least one of the username or the password is used to log-on to the one or more of the user interfaces.

3. The method of claim 1, further comprising:
   comparing an expected output to an actual output, wherein the expected output corresponds to information expected to be received when a user action interacts with at least one of the one or more user interfaces and the actual output corresponds to information actually received when the user action interacts with the at least one of the one or more user interfaces; and
   generating a difference output that includes a difference between the expected output and the actual output, wherein the difference output includes a user interface that includes an expected portion of the expected output and an actual output portion of the actual output that are determined to be different based on the comparing, and wherein a color coding indicates which is the expected portion and which is the actual output portion.

4. The method of claim 1, further comprising:
   receiving a user input indicating to execute a portion of the test case, wherein the portion of the test case includes one or more test steps, and wherein the executing further comprises:
   executing the portion of the test case according to the user input.

5. The method of claim 1, wherein the interpreting comprises:
   interpreting a column in the spreadsheet as a test command.

6. A method comprising:
   coding an expected output file, which pertains to a test case, to indicate one or more portions of an expected output to ignore for comparison in relation to an actual output;
   accessing, by a device, the test case that tests one or more user interfaces associated with another device, wherein the test case is defined in a spreadsheet;
   interpreting, by the device, the test case, wherein a row in the spreadsheet is interpreted as a test step of the test case;
   executing, by the device, the test case with respect to the one or more user interfaces associated with the other device, wherein the executing comprises:
      comparing the expected output to the actual output of an executed test case based on the expected output file, wherein the expected output corresponds to information expected to be loaded with respect to at least one of the one or more user interfaces and the actual output corresponds to information actually loaded with respect to the at least one of the one or more user interfaces; and
      generating a difference output that includes a difference between the expected output and the actual output; and
   outputting, by the device, the test result that includes the difference output.

7. The method of claim 6, further comprising:
receiving a user input to retrieve data associated with at least one of the one or more user interfaces;
capturing the data; and
permitting a user to copy-and-paste the data into the spreadsheet.

8. The method of claim 6, wherein the interpreting comprises:
interpreting a column in the spreadsheet as a test command.

9. A device comprising:
a memory, wherein the memory stores instructions; and
a processor, wherein the processor executes the instructions to:
receive a user input corresponding to a custom variable;
decrypt an encrypted file based on the custom variable;
retrieve at least one of a username or a password from the encrypted file, wherein the at least one of the username or the password is used to log-on to one or more user interfaces being tested;
access a test case that tests the one or more user interfaces associated with another device, wherein the test case is defined in a spreadsheet;
interpret the test case, wherein a row in the spreadsheet is interpreted as a test step of the test case;
execute the test case with respect to the one or more user interfaces; and
output a test result, wherein the test result includes a difference output that includes failures or errors occurring during an execution of the test case.

10. The device of claim 9, wherein, when interpreting the test case, the processor further executes the instructions to:
interpret columns within the spreadsheet as a test definition, a test variable, or a test command.

11. The device of claim 9, wherein the one or more user interfaces include at least one graphical user interface.

12. The device of claim 9, wherein the processor further executes the instructions to:
recognize a syntax of a custom variable included in the spreadsheet;
access a custom variable file in response to a recognition of the syntax, wherein the custom variable file stores a custom variable value, wherein each user can assign a different custom variable value;
retrieve the custom variable value from the custom variable file, and wherein when executing the test case, the processor further executes the instructions to:
execute the test case using the custom variable value.

13. A device comprising:
a memory, wherein the memory stores instructions; and
a processor, wherein the processor executes the instructions to:
access a test case that tests the one or more user interfaces associated with another device, wherein the test case is defined in a spreadsheet;
interpret the test case, wherein a row in the spreadsheet is interpreted as a test step of the test case;
execute the test case with respect to the one or more user interfaces, wherein an execution of the test case comprises:
compare an expected output to an actual output, wherein the expected output corresponds to information expected to be received when a user action interacts with at least one of the one or more user interfaces and the actual output corresponds to information actually received when the user action interacts with the at least one of the one or more user interfaces; and
generating a difference output that includes a difference between the expected output and the actual output, wherein the difference output includes a user interface that includes an expected portion of the expected output and an actual output portion of the actual output that are determined to be different based on a comparison, and wherein a color coding indicates which is the expected portion and which is the actual output portion; and
output a test result, wherein the test result includes the difference output.

14. The device of claim 13, wherein the processor further executes the instructions to:
receive a user input indicating to execute a portion of the test case, wherein the portion of the test case includes one or more test steps, and
execute the portion of the test case according to the user input.

15. The device of claim 13, wherein the processor further executes the instructions to:
receive a user input to retrieve data associated with the one or more user interfaces;
capture the data;
permit a user to copy-and-paste the data into the spreadsheet.

16. The device of claim 13, wherein, when interpreting the test case, the processor further executes the instructions to:
interpret columns within the spreadsheet as a test definition, a test variable, or a test command.

17. A non-transitory storage medium storing instructions executable by at least one processing system, the instructions comprising instructions to:
receive a user input to retrieve data associated with one or more user interfaces;
capture the data;
permit a user to copy-and-paste the data into a spreadsheet;
access a test case that tests the one or more user interfaces associated with another device, wherein the test case is defined in the spreadsheet;
interpret the test case, wherein rows in the spreadsheet correspond to test steps of the test case;
execute the test case with respect to the one or more user interfaces associated the other device; and
output a test result.

18. The non-transitory storage medium of claim 17, wherein the instructions to execute further comprise instructions to:
recognize a syntax of a custom variable included in the spreadsheet;
access a custom variable file in response to a recognition of the syntax, wherein the custom variable file stores a custom variable value;
retrieve the custom variable value included in the custom variable file; and
execute the test case using the custom variable value.

19. The non-transitory storage medium of claim 17, wherein the instructions to interpret further comprise instructions to:
interpret the rows of the spreadsheet as including test values and interpret columns of the spreadsheet as test commands.

20. The non-transitory storage medium of claim 17, the instructions further comprising instructions to:
receive a user input indicating to ignore one or more lines associated with an expected output;

store the user input in an expected output file, and wherein the instructions to execute further comprise instructions to:
  compare an expected output included in the expected output file to an actual output, wherein the expected output corresponds to information expected to be loaded with respect to at least one of the one or more user interfaces and the actual output corresponds to information actually loaded with respect to the at least one of the one or more user interfaces; and
  generate a difference output that includes a difference between the expected output and the actual output.

\* \* \* \* \*